Jan. 16, 1945.  J. C. MORRELL  2,367,419
PROCESS FOR MAKING CONTAINERS
Original Filed May 25, 1938   2 Sheets-Sheet 1
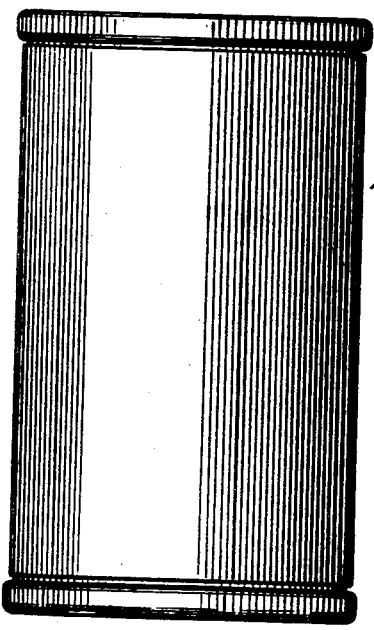
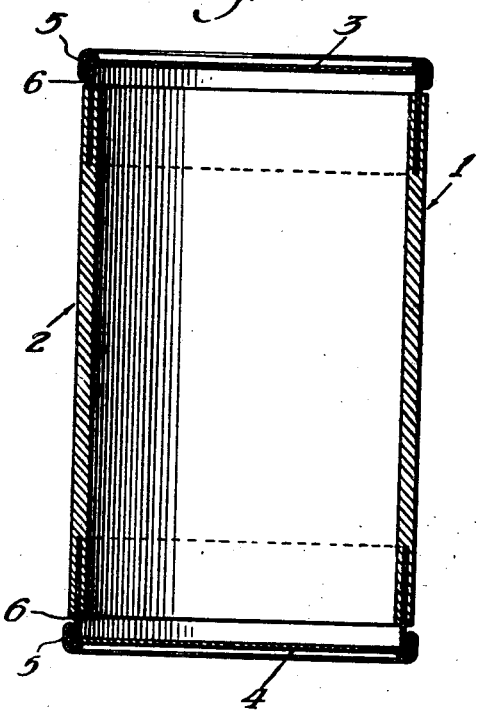
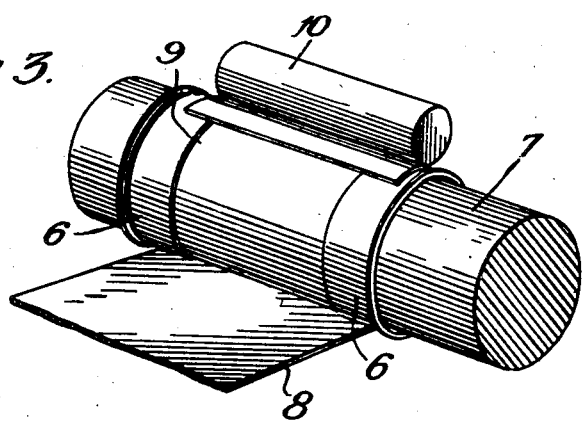
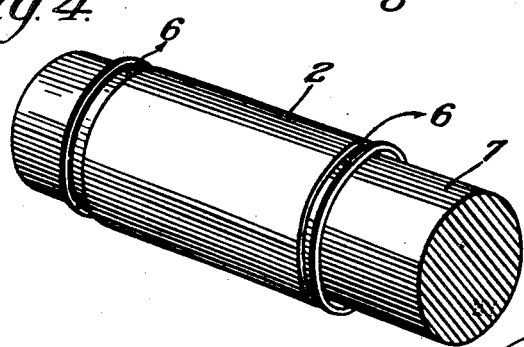
INVENTOR.
Jacque C. Morrell Jan. 16, 1945.   J. C. MORRELL   2,367,419
PROCESS FOR MAKING CONTAINERS
Original Filed May 25, 1938   2 Sheets-Sheet 2
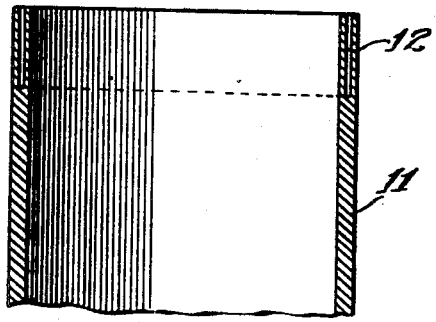
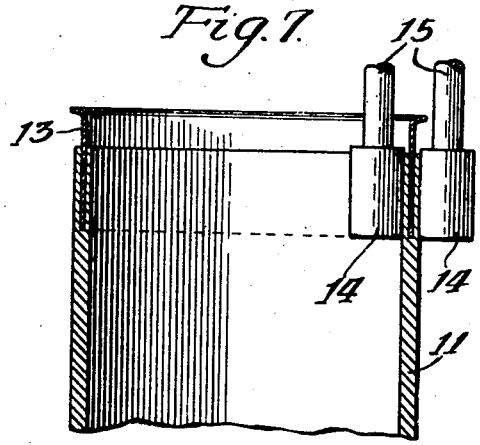
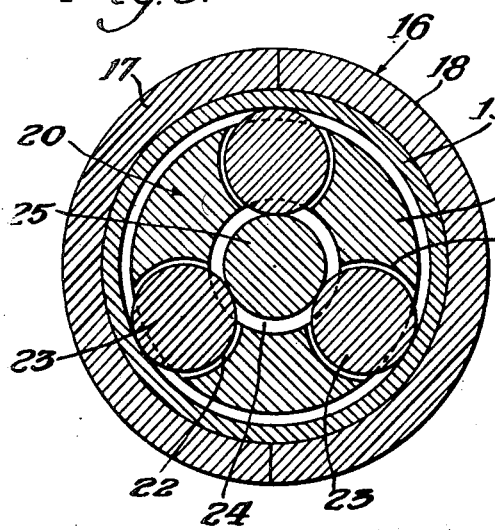
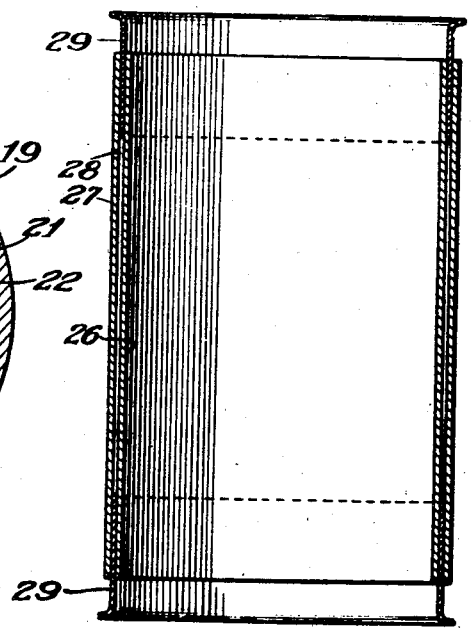
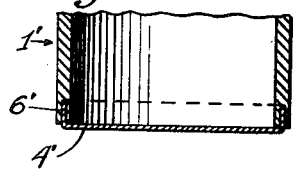
INVENTOR.
BY Jacque O. Morrell Patented Jan. 16, 1945

2,367,419

UNITED STATES PATENT OFFICE 2,367,419

PROCESS FOR MAKING CONTAINERS

Jacque C. Morrell, Oak Park, Ill.

Original application May 25, 1938, Serial No. 209,949. Divided and this application September 2, 1941, Serial No. 409,327

8 Claims. (Cl. 93—39.1)

This is a division of my application No. 209,949, filed May 25, 1938 patented June 2, 1942 and issued as Patent No. 2,285,219.

This invention relates to improvements in receptacles or containers and processes of making the same and refers particularly to receptacles or containers for packaging solids or liquids or mixtures of the same such as food-stuffs and perishables generally.

In the general embodiment of the invention the process comprises building a container constructed of a fibrous base saturated with a resinous or plastic binder, preferably thermosetting, the container having a lateral wall and embedding collars preferably metal in the thickness of the said wall and projecting from the opposite ends of the wall and securing a top and bottom of the container to the collars.

In the preferred embodiment of the invention the body of the receptacle or container, which may be of any shape but is preferably cylindrical, is constructed of a laminated fibrous base saturated with a plastic or resinous binder or is made up of successive layers of synthetic resin or plastic composition and fibrous, fabric-like or textile materials such as paper, cardboard, cloth, asbestos and the like, which are coated or saturated with the resinous or plastic materials. The container or receptacle has a lateral wall or walls and collars preferably of metal are embedded in the thickness of the wall and project from the opposite ends thereof with a top and bottom also preferably of metal secured to the collars.

The mixture of fibrous and resin or plastic material may be molded with the collars in place or preferably the fibrous material comprising, e. g., uns'zed paper is saturated with the resinous or plastic material in the conventional manner, i. e., employing a solution of the resin or plastic, passing the paper or other fabric through the solution and removing and recovering the solvent. The latter is usually an alcohol, ketone, aldehyde or mixture or other suitable solvent for the synthetic resin. The synthetic resin employed is preferably one which exists as a soluble, fusible material—for example that resulting from the reaction of phenols and aldehydes generally, e. g., phenol and formaldehyde, which may subsequently be converted after saturating the fibrous material, e. g., paper or other fabric and removing the solvent into an insoluble, infusible form of the resin by subjecting the laminated product to heat or preferably heat and pressure combined, after forming the same into the desired shape, e. g., a cylinder.

In the drawings Fig. 1 is a side elevational view of my improved container.

Fig. 2 is a sectional elevation of the container shown in Fig. 1.

Fig. 3 is a fragmentary, perspective view illustrating the second step in the process of formation of my container.

Fig. 4 is a perspective view of the container carrying the metal collars, the container being upon the winding mandrel.

Fig. 5 is a cross-sectional view illustrating another means for forming my container made up of an outer cylindrical tube in two parts and a member inserted within the cylinder with adjustable rolls for pressing and consolidating the laminated walls of the container.

Fig. 6 is a fragmentary, sectional elevational view of a portion of a modified form of cylinder illustrating particularly the annular slot provided for the reception of the metal collars.

Fig. 7 is a view similar to Fig. 6 illustrating the collar in position upon the end of the cylinder and a means for securing the collar to the cylinder.

Fig. 8 is a sectional elevational view of another form of my invention, wherein the metal collars are placed between the outer and inner wall surfaces of two concentrically positioned outer and inner composition laminated cylinders.

Fig. 9 is a fragmentary section elevation of another modification of the container.

Referring in detail to the drawings, I indicates a container of the cylindrical type having cylindrical walls 2, top 3 and bottom 4. As a feature of my invention the cylindrical walls 2 of the container I are constructed of a plastic fibrous or more specifically synthetic resin paper composition material preferably of laminated construction. The top 3 and bottom 4 are preferably constructed of metal and are secured as by crimping 5 by cylindrical collars 6 which are embedded in the thickness of the walls 2, said collars projecting from the ends of the cylinder a distance sufficient to permit securement of the top and bottom.

As has been hereinbefore described, the cylindrical wall 2 of the container I is constructed of a composition material and may be fabricated by molding or by winding a continuous web of plastic, synthetic resin or other suitable saturated fibrous material, either fabric or paper, in cylindrical formation in the particular case under discussion. Although the cylindrical member 2 may be constructed in accordance with both methods mentioned above, I prefer to utilize the last mentioned procedure, since the laminated structure is materially stronger. However, for certain classes of use the cylindrical member 2 may be constructed of a typical molding composition containing plastics or synthetic resins and fibrous materials as hereinafter referred to.

In forming the cylindrical member 2 a mandrel 7 may be rotated by suitable driving means (not shown) and a web 8 of previously treated sheet material, either fabric or paper, may be wound upon said mandrel to a predetermined thickness to form an inner half 9 of the cylindrical member 2. During the winding operation a roll 10 may bear upon the strip being wound to consolidate the strip and densify the same. After a predetermined thickness of sheet material has been wound, the collars 6 may be placed in position over the ends of the partially wound portion 9. Another strip of sheet material 8 is then wound upon the partially constructed portion 9, the second strip 8 being so wound as to embrace a portion of the end collars 6, which in the final cylinder 2 are embedded in the ends of said cylinder. During the winding of the second strip 8, the roll 10 bears upon the strip being wound and tends to consolidate and compact the same.

After a predetermined thickness of strip material 8 has been wound upon the partially wound member 9 and the collar 6, the completed cylinder 2 may be removed endwise from the mandrel 7. To facilitate the removal of the cylinder 2 from the winding mandrel, a mandrel may be used which is split longitudinally. The split mandrel is not shown in the drawings since such devices are well known. If desired, the mandrel 7 may be constructed in two pieces which abut endwise within the cylinder 2. To remove the cylinder from the mandrel the abutting ends may be separated. Further, if desired, the abutting portions of the mandrel may be tapered toward their abutting ends to facilitate removing both portions of the mandrel from the cylinder.

Referring particularly to Figs. 6 and 7, a modified form of my invention is shown wherein a composition cylinder 11 may be constructed of a treated laminated sheet of fabric or paper or may be of molded construction. In this form of my invention an annular slot 12 is provided in the thickness of the cylinder walls adjacent each end of the cylinder, each slot opening toward each end of the cylinder 11. A metal collar 13 similar to collar 6 may be inserted in the annular slots 12 at each end of the cylinder and said cylinder may be inserted between a pair of juxtaposed press rolls 14 which are mounted upon shafts 15 driven from any suitable source of power (not shown). The press rolls 14 act upon the inner and outer face of the cylinder 11 adjacent its ends so as to densify and mechanically lock the composition material comprising the cylinder about the embedded portion of the collar. If desired, the embedded portion of the collar 13 may be coated with a suitable adhesive preferably one which is soluble in or becomes fusible either before or during curing of the cylinder with the impregnant utilized with the materials comprising the wall 11.

Referring particularly to Fig. 5, a device is shown in transverse section for densifying or consolidating a strip or sheet wound as has been hereinbefore described, or for densifying and consolidating a laminated cylinder which has been built up in layer fashion of a plurality of discontinuous fibrous or fabric sheets which have been previously treated. In this device the loosely wound cylinder with metal ends inserted may be consolidated, or the inner laminated surface may be applied to the otherwise completed cylinder with metal ends or a cylindrical tube 16 formed in two parts, 17 and 18, may circumscribe a cylinder 19 constructed as hereinbefore described. The latter may be made up by other devices and conversely the means described may be used otherwise than herein noted. Describing Fig. 5 further, a member 20 may be inserted within the cylinder 19 and may comprise a race 21 having a plurality of arcuate recesses 22. In each of the recesses 22 a cylindrical roller 23 is positioned, said rollers being free to revolve about their own axes and having a limited degree of freedom of movement in a radial direction with respect to the cylinder 19. The race 21 is provided with a central aperture 24 in which a longitudinally tapered shaft 25 may be positioned. This same general type of device is employed in rolling tubes into tube benders in tubular stills, boilers and the like.

In utilizing the device hereinabove described, means is provided for rotating the race 21 within the cylinder 19 which causes rollers 23 to bear upon the inner periphery of the cylinder 19. The longitudinally tapered shaft 25 may be moved axially to press or force rollers 23 radially into contact with the inner walls of the cylinder 19. When the cylinder 19 has been densified or consolidated to the desired degree, the race 21 may be removed from within the cylinder in a manner which is clear to those skilled in the art. The halves 17 and 18 of the outer tubular member may then be removed.

Referring particularly to Fig. 8, another modification of my invention is shown which comprises a pair of coaxial cylinders 26 and 27, the inner and outer cylinders respectively. The cylinders 26 and 27 may be constructed of composition material, e. g., of the kind already referred to and described, either laminated or non-laminated and may be of such respective diameters that clearance 28 is provided between the cylinders. Collars 29 may be positioned between the inner and outer cylinders respectively, the ends of said collars projecting from the ends of the cylinders. Similar to the form of my invention illustrated in Figs. 6 and 7, an adhesive preferably of the same type as is used for saturating the fibrous material or substances which are soluble, fusible or otherwise compatible therewith may be utilized to secure the collars 29 firmly in place between the cylinders. If desired, the space 28 between the inner and outer cylinder may be maintained as such or the cylinder walls may be subjected to pressure in order to bring said walls into abutting relationship thereby forming a solid cylinder wall.

Fig. 9 shows a modification of my container similar to Fig. 1 wherein the container 1' has lateral walls made of fibrous material interspersed with a plastic binder as described but in which the bottom 4' is integral with the collar 6', the latter being made of metal. The top of this container may be secured to a metal embedded in the walls of the same as is illustrated in connection with Figs. 1 and 2.

In all cases where necessary or desirable the laminated product may be subjected to curing or conversion, i. e., converting the soluble, fusible types into the insoluble, infusible forms or to partial curing dependent upon the degree of curing or conversion which it has undergone during the preceding treatment by a heat treatment.

In view of the many variations in the procedure of fabrication which I may employ I shall describe several other methods, procedures, or further details of those already described to further illustrate my invention, it being understood that I do not necessarily limit myself to the exact details connected therewith or to those of the methods already described.

In general the resin saturated or coated paper may be wrapped on the cylindrical form as is illustrated in Fig. 3 to build up several layers and the surface and walls compressed or consolidated, e. g., by hot rolling, but preferably avoiding complete conversion of the resin into the insoluble, infusible form. The metal collars 6 in Fig. 3 or ends are then placed in position, the remaining thicknesses of resin saturated paper or other fibrous material is then wound on, and then further compressing or consolidating the outer layers or surfaces. In the method where the collars or metal ends are inserted into annular slots, as is illustrated in Figs. 6 and 7, the entire body of the cylinder except the ends may be consolidated and then stripped off the mandrel or form and after inserting the metal ends or collars, using an adhesive comprising a resin or plastic or other suitable material as described, if desired, the ends may then be compressed and/or consolidated by suitable rolls, or the entire process may be completed without removal of the cylinder, if desired.

Another method of sealing the collar onto the partially formed cylinder as described, which may also be applicable to any of the forms or methods already described or to be referred to later, is by the use of a solvent such as acetone, alcohols, or phenols, etc., which is applied to the top and bottom or over the complete outer surface or in the annular slots of the compressed walls of the partially completed cylinder, placing the collars in position and completing the container as described. The solvent will also soften the infusible and generally insoluble resin.

In another aspect of the process of the invention the wall thickness of a cylinder may be partially built up and compressed and the plastic or resin partially cured in the manner described. The collars may then be placed in position on the ends of the cylinder in the manner illustrated in Fig. 3, making a fairly neat fit and, if desired, helping adhesion by first surfacing the ends with resin or other adhesive; additional resin sealing material may be applied to the collar and the walls of the container completed by further winding or rolling of the resin saturated paper over the metal ends and subsequent compressing by rolls or other means of the added layer, the operation of which is also illustrated in Fig. 3. In this particular method the first completed thin rolled cylinder may first be stripped off the form and the metal collars or ends placed on before completing the winding of the roll or cylinder and consolidation.

Still other details in the methods of assembling or manufacturing the container may be employed, for example, a variation of that shown in Fig. 5 wherein the composition plastic fabric or resin fiber cylinder comprising the body of the container may be made up upon a metal cylinder or form to approximately one-half the wall thickness after consolidation by pressure, the cylinder thus formed is removed and placed within the external split metal sleeve with the metal end placed in position inside the cylinder. The inside wall and surface of the cylinder comprising the body may then be rolled in using the roller and tapered mandrel device shown in Fig. 5 employing either a pre-fabricated cylinder or by consolidating loosely wound or overlapping sheets adapted to be placed in position so as to conform to the inside of the cylinder comprising the body of the container and consolidating by rolling as described.

As a further adaptation in the employment of the loosely wound cylinder or in general loosely laminated sheets either continuous or discontinuous, comprising fibrous material, paper or other fabric saturated or coated with plastic or synthetic resins, the body of the container may be molded from the said laminated material by placing the metal collars or ends in position in the laminated walls of the pre-fabricated container body and consolidating the said walls by molding in a conventional manner. Molding may also be employed with mixtures containing synthetic or other resins or plastic materials and fillers, preferably of a fibrous character as hereinafter described and may be applied to all of the shapes and forms and intermediate stages hereinbefore described, e. g., the cylinder or body of the container per se may be molded with the metal collars or ends in place or providing annular slots for the same. As one special feature it is contemplated employing an inner molded cylinder circumscribed by or coaxial with an outer laminated cylinder, the metal collars being placed between the cylinders. The arrangement is similar to that shown in Fig. 8. This may be done by making up the laminated cylinder as described with relatively thin walls, placing the metal collars in position and pressing or molding in the non-laminated inner walls. Various combinations of molded and laminated inner and outer cylinders (with the laminated type preferably on the outside), and the metal collars or ends between may be employed as well as other combinations of the methods and means already described.

Various devices may be employed in connection with forming the cylinder or body of the container, for example, as previously pointed out the cylinder or mandrel or other form upon which the fabric or paper saturated with synthetic resins or plastics is wrapped may be transversely or longitudinally split, or a tapered mandrel, or if desired abutting mandrels tapered towards the middle from both ends may be employed to facilitate removal of the cylinder comprising the body of the container.

Another device for facilitating removal of the container body from the cylindrical form or mandrel upon which it is wrapped is to employ a cylinder or mandrel which may be alternately heated when wrapping and consolidating, and then cooled when removing the composition cylinder. The form may be hollow to permit circulation of steam or hot or cold water or other fluids. This causes the mandrel or cylinder form to be in an expanded condition when wrapping and to shrink upon cooling when the cylinder is removed. A lubricant comprising graphite, talc or other material may be used to minimize sticking of the cylinder to the form or to facilitate the removal. In the absence of a special device the cylinder or container body is simply stripped from the form or mandrel by pulling or forcing the latter through an aperture or opening which will not permit the cylinder to pass through.

In addition to the variations in methods of fabrication, examples of which have been shown, there are also variations in mechanical means for accomplishing the same. Some of these, e. g., the expanding roll, comprising cylindrical rolls with a tapered mandrel to compress the walls of the composition cylinder, have already been described in connection with Fig. 5. Other means comprise co-acting inner and outer rolls, preferably with spring or other tension to consolidate the walls of the composition cylinder by pressure on the outer and inner surfaces and thus also seal on the metal ends, although better results are obtained when either the inner or outer pressure element is relatively stationary.

As a further development of detail to assist in securing the metal ends or collars in the walls of the container the portions of the metal ends which are embedded on the walls of the composition cylinder or body of the container may be perforated with smooth or with grater-like holes or the surfaces roughened to promote adhesion and cohesion and to facilitate fastening and sealing the metal ends with the body of the container. In the case where the collars are perforated the laminated sheets will cohere to each other through the perforations.

Referring to the collars, which are preferably of metal, e. g., the usual tin plate or coated with some other protective material, illustrated in Fig. 3 they may be of a single piece, or joined by a crimped, curled, or plain lap seam, and soldered before or after placing in position or embedding in the walls of the composition container and the protruding ends may likewise be crimped or curled to permit attachment of the tops and bottoms in the conventional manner as employed in the metal can or container industry employing a rubber composition or other sealing material. It may be desirable in some cases to crimp the protruding ends after the collars have been embedded in the walls of the container. Also in some cases the bottom end may be integral with the collar. In the methods described the protruding ends of the metal collars are preferably crimped or curled in such manner as to permit attachment of the top and bottom lids in the conventional and well known manner employed in the metal container or can industry.

While I have described several methods and means of manufacture, particularly of attaching the metal collars or ends to the cylinders, combinations of all of these may be employed and other expedients which would be obvious to one skilled in the art may be resorted to.

Also it is within the scope of the invention, although not preferred and not considered as equivalent to the other methods described, to fasten the metal collar ends directly to the composition plastic fabric or synthetic resin fiber cylinder by crimping, preferably before consolidating the ends thus crimped. The tops and bottoms may then be affixed to the metal collars in the usual manner. The pressure thus employed together with heat will result in partially converting the synthetic resin into the desired form. In this manner the bottoms may be affixed and the top collar or top and bottom collars attached and the tops and bottoms later attached in the usual manner.

These metal collars or ends may also be adapted to be opened like the usual "self opening" cans which have a relatively narrow strip integral with the metal collar or cylindrical portion or sides of the can at a point beneath the top or lid. In this case the strip would extend sufficiently out of the wall of the laminated body of the container to permit an outlining of the strip along its edges by lines which cut the surface of the metal and weaken the same so that the strip may be torn or sheared therefrom thus opening the can by removing the top and upper portion of the cylindrical side wall. The top lid in this case may be depressed to eliminate the otherwise vacant space in the container. Other alternatives of this idea may be employed such as a separate cylindrical piece or collar rolled into a bead provided in the side of the can, beneath the tearing strip, which extends to the lid or top and prevents solid material to be contained in the can from spilling when the tearing strip is removed. It is not desired to claim any particular design of tearing strip but merely to point out that it may be adapted to this new form of can or container.

Briefly recapitulating one aspect of the process of the invention a solution is made up of the resin, preferably formed by reacting phenol or cresols or mixtures of the same with formaldehyde or employing the urea formaldehyde type of resin and dissolving the said resins in ethyl alcohol or acetone or other suitable solvent to make up a solution of a substantial concentration, which will permit saturation of the paper or fabric passed therethrough or immersed therein. These resins may be prepared with suitable catalysts to permit conversion of the same into the insoluble, infusible form after the body of the container has been formed. The fabric preferably comprising a continuous sheet of heavy unsized paper, e. g., of the Kraft type, is passed continuously through a bath of the solution of resin guiding the same through the liquid and maintaining it submerged by rolls. The solvent is then removed as described, e. g., by passing through a heated zone preferably with a stream of heated gas and preferably recovered. The dried or partially dried paper, preferably of the same approximate width as the length of the container, saturated with resin is rolled over a cylindrical form illustrated in Fig. 3 until approximately one-half of the layers comprising the finished wall thickness have been applied. The metallic collars 6 in Fig. 3, to which the top and bottom of the container are to be attached, may then be put in position by placing the same over the ends of the roll of paper represented as 8 and 9 in Fig. 3, saturated with resin or other plastic and permitting a small portion of the collar to protrude to permit attachment of the top and bottom of the container—preferably the protruding ends or top only when the bottom and collar are integral, are crimped or curled to permit attachment of the lid in the conventional manner as described. The sides of the metallic collars (except where the bottom is integral therewith) may if desired be split or partially closed by crimping to permit proper adjustment when the walls of the resin-fabric container are subjected to pressure and then later sealed by soldering or in a manner which is well known and conventional in the present art of making metallic cans or the sides of the collars may be crimped and soldered prior to insertion in the resin-paper fabric walls of the container. The resin saturated paper is then wound or rolled over the metallic ends to complete the wall thickness of the container, which is consolidated by rolling simultaneously converting in part the fusible, soluble resin into infusible, insoluble type and embedding the metal ends. If the resin is not converted sufficiently at this stage it may be heated in an oven subsequently to convert the soluble, fusible resin into the insoluble, infusible type.

Regarding specific concentrations of the plastics or synthetic resins, temperatures of treatment, pressure, etc., the following may be stated generally: Solutions of synthetic resins and plastics varying from 10 to 90 percent more or less are employed in saturating the paper fabric or textile, with a preferred concentration of 25 to 50 percent more or less. The temperatures employed during fabrication would be from just beyond the flow point of the synthetic resin or plastic employed up to a temperature where incipient or even substantial conversion of the soluble, fusible to the infusible, insoluble type occurs, depending upon the results desired. Temperatures varying from 150 to 300° F. and above when the time of treatment is short enough may be employed. The pressures employed during the rolling and/or consolidation operation should be sufficient to effect the desired results of integrating the laminated layers of synthetic resin and/or paper or fabric.

After the receptacle or container is formed in accordance with the methods described it may be subjected to a further heat treatment varying in temperature from 150 to 400° F., depending upon the type of synthetic resin and the time of treatment, for example from about one-half hour at the higher temperatures up to several hours for the lower temperatures, to further convert the soluble and fusible type of resin into the insoluble, infusible type. For certain types of plastics this is unnecessary.

After curing or converting in the manner described and in some cases prior to this operation, depending upon materials used, the method of manufacture employed and the results desired, certain finishing or trimming operations may be carried out; for example in finishing the surfaces and trimming the edges of the laminated composition of which the container is made, machining or grinding operations may be employed. One method of carrying this out is the use of the so-called centerless grinder for finishing the outer and inner surfaces simultaneously. These operations may however be accomplished in any well known or desirable manner.

The preferred plastics or synthetic resins as described are those of the phenol formaldehyde (including also cresols, xylenols, etc.), or urea formaldehyde types, which form infusible and insoluble resins on heat treatment. These are preferred because after being converted into the infusible, insoluble types, they are quite resistant to temperatures required for treating packaged food materials to prevent spoilage such as in the canning of fruits, vegetables, meats, fish, etc. Other types of resin may however be employed, among which are the alkyl resins (glyptals made from polybasic acids such as phthalic and maleic acids and polyhydric alcohol, such as glycerol, glycols, etc.), styrene resins, e. g. the polystyrene types, acrylic or acrylate resins, e. g. methacrylate, the vinyl or vinylite polymer which may include acetate, halides, polyvinyl alcohols plus aldehydes, etc. Resins with accompanying plasticizers if needed, such as tricresyl phthalates, etc., may be employed. Also the thermoplastics may be used in some cases, e. g., cellulose acetate and cellulose nitrate types, including lacquer types, ethyl cellulose and similar materials. Various rubber compositions may be used, including those plastics resembling rubber such as synthetic rubbers, duprene, neoprene and thiokol, chlorinated rubber, etc. In relatively rare instances inorganic materials such as sodium silicate may also be used. Lignum resins or certain varnish resins may under some conditions be employed such as ester varnish, coumarine, indene, shellac, etc. In some cases mixtures containing plasticizers and/or drying oils may be employed where conditions of use warrant it. The thermo-setting types, i. e., those which are relatively infusible and resistant to the elevated temperatures employed for sterilization of foods are preferred, and are not equivalent to the others. In some cases certain types of the thermoplastic resins, e. g., the polystyrene, which may be heated to high temperature without flowing or melting may be employed and are therefore to be preferred to those types which in the present sense are less heat resistant.

The solvents employed with these have been referred to generally and comprise alcohols, ethers, ketones, aldehydes, esters or mixtures.

Regarding the types of fabrics or textiles which may be used in general it may be said that paper is preferred, particularly the unsized; for example that made by the Kraft or sulphate method, but other methods may be employed such as the sulphite and those well known to the paper art. In paper making any vegetable substance which possesses a sufficiently fibrous structure can be utilized and this may in the same way be applied to the present invention. Materials of the nature of blotting paper and cardboard types may also be employed in certain cases. In some cases bleached papers may be used and it may also be desirable to load the papers, using some mineral matter such as precipitated chalk, calcium sulphate, china clay, mineral white, barium sulphate, titanium oxide, etc. This may have the effect of pigmenting the paper white and may be done prior to or during the saturation of the paper with the resin. It may also be desirable to color the containers, particularly to overcome the slightly yellowish tinge which results in paper making or to impart a definite and characteristic color, in which case natural or synthetic dyestuffs or pigments may be employed.

In fact all of the methods known to the art of paper making for the various purposes for which it is used may be applied here.

Having described several specific methods of fabricating the receptacles or containers particularly in cylindrical form, it is quite obvious that the same methods may be adapted to other shapes and forms, for example of square or rectangular or other cross-section or shape. Various methods of winding or rolling the paper web or fabric in making the laminated forms may be employed, for example, straight or diagonal and various types of papers, cardboards, etc., may be used as previously referred to, the unsized paper being preferred. Also the various combinations of the specific methods described may be employed as well as variations which might be obvious to one skilled in the art after a study of the above methods.

It is also to be understood that while I have described methods for making laminated composition of resins and fabric materials of various kinds, including papers of all types, textiles, etc., molded compositions made up of sheets of paper and synthetic resin or plastic materials or of the types which in the present sense are less heat resistant plastic and/or resinous filler materials are contemplated for use, although it is also to be understood that these are not equivalent to the forms described.

For example I may employ molding mixtures containing synthetic or other resinous or plastic materials and fillers such as wood flour, mineral matter, etc., preferably employing fibrous materials such as paper fibers or pulp, cotton, jute, ramie, hemp and other natural fibers, artificial fibers such as rayon, mineral fibers such as asbestos and fibrous materials generally in admixture with the various plastic or resinous materials already mentioned, the preparations of fibrous and resinous materials being somewhat conventional, e. g., as one typical example may be mentioned 45 percent synthetic resin, 4 percent hardening agent, 1 percent lubricant, 0.5 percent dye or pigment, 48 percent long fiber asbestos. This however may vary to a fairly wide degree. These mixtures are molded by means well known to the art into cylindrical or other shapes with the metal collars or ends placed in position and sealed in the wall thickness and with sufficient protrusion from the body to provide attaching means for the metal tops and bottoms in the conventional manner as in the metal can or container industry. In another modification of molding the fibrous resin or plastic composition loosely laminated continuous or discontinuous fabric or paper sheets saturated with resin or plastic material may be molded under heat and pressure with the metal collars or ends in position. The laminated sheets may also be rolled into place on the inner surface by means illustrated in Fig. 5. Likewise in both general forms described above, namely the laminated and molded types, particularly the latter, which it is to be definitely understood are not equivalents, reinforcing materials may be employed, e. g., metal wire and gauze if desired.

In still another modification of the invention the materials comprising the fibrous base and resinous or plastic substances may be applied or built up over the outer and/or inner walls of the ordinary metallic can, container or receptacle; thus avoiding the use of tin plating or other corrosion protecting material except for the ends that protrude and the tops and bottoms and permitting the use of ordinary thin sheet iron for the body of the container, e. g., the walls of the can or container may be roughened or perforated and the composition fibrous and plastic or resinous material may be applied on the outer or inner walls by molding or preferably as a laminated composition by any one or a combination of the methods heretofore described. Also one surface may be molded and the other laminated.

Where the laminated surfaces are applied they may be consolidated by compressing or rolling, employing e. g. the method shown in Fig. 3 for the outer surface and Fig. 5 for the inner surface. The metal tops and bottoms may then be secured in the usual manner.

The above described modification may be illustrated further in finished form by Fig. 1 and in cross-section by Fig. 8 by assuming the embedded ends of collars 29 in Fig. 8 to be extended and joined or to be integral with each other. Numbers 26 and 27 in Fig. 8 represent the inner and outer fibrous and plastic or resinous composition of the molded or laminated types, although these are not to be considered as equivalents.

It is to be readily understood that the specific examples and conditions in respect of materials and details of process are in many cases given for illustrative purposes as many combinations may be employed; hence they are not to be considered as limitations upon the broad scope and spirit of the invention.

I claim as my invention:

1. A process of manufacturing containers which comprises building a container wall of fibrous material interspersed with a plastic binder, embedding a collar in the thickness of said wall at each end of the container whereby to seal the said collar in the said wall, densifying said wall by pressure and uniting a bottom and top to the collars wholly beyond the adjacent ends of the said walls and in non-embracing relation with respect thereto.

2. A process of manufacturing containers which comprises building a container wall of fibrous material interspersed with an adhesive, embedding a collar in the thickness of said wall at each end of the container whereby to seal the said collar in the said wall, densifying said wall by pressure and uniting a bottom and top to the collars wholly beyond the adjacent ends of the said walls and in non-embracing relation with respect thereto.

3. A process of manufacturing containers which comprises building a container wall of fibrous material interspersed with a thermoplastic binder, embedding a collar in the thickness of said wall at each end of the container whereby to seal the said collar in the said wall, densifying said wall by pressure and heat and uniting a bottom and top to the collars wholly beyond the adjacent ends of the said walls and in non-embracing relation with respect thereto.

4. A process of manufacturing containers which comprises building a container wall of fibrous material interspersed with a synthetic thermo-setting binder, embedding a collar in the thickness of said wall at each end of the container whereby to seal the said collar in the said wall, densifying said wall by pressure and heat and uniting a bottom and top to the collars wholly beyond the adjacent ends of the said walls and in non-embracing relation with respect thereto.

5. A process of manufacturing containers which comprises building a container wall of fibrous material interspersed with a binder, embedding a collar in the thickness of said wall at each end of the container whereby to seal the said collar in the said wall, densifying said wall by pressure and heat and uniting a bottom and top to the collars wholly beyond the adjacent ends of the said walls and in non-embracing relation with respect thereto.

6. A process of manufacturing containers which comprises building a laminated container wall of fibrous sheet material impregnated with a plastic binder, embedding a collar in the thickness of said wall at each end of the container whereby to seal the said collar in the said wall, and uniting a bottom and top to the collars wholly beyond the adjacent ends of the said walls and in non-embracing relation with respect thereto.

7. A process of manufacturing containers which comprises building a container wall of fibrous material interspersed with a plastic binder, embedding a collar in the thickness of said wall at each end of the container, densifying said wall by pressure and uniting a cover to at east one of said collars wholly beyond the adjacent end of said wall and in nonembracing relationship with respect thereto, the other collar being characterized by having a cover integral therewith, whereby to produce a sealed container.

8. A process of manufacturing containers which comprises building a container wall of fibrous material interspersed with a plastic binder, embedding a collar in the thickness of said wall at each end of the container, densifying said wall by pressure and uniting a cover to at least one of said collars wholly beyond the adjacent end of said wall and in nonembracing relationship with respect thereto, whereby to produce a sealed container.

JACQUE C. MORRELL.